United States Patent [19]
Bravo et al.

[11] Patent Number: 5,826,919
[45] Date of Patent: Oct. 27, 1998

[54] FLEXIBLE PENETRATION FITTING

[75] Inventors: Sergio M. Bravo, Los Alamitos; Don K. Mukai, Pasadena, both of Calif.

[73] Assignee: S. Bravo Systems, Inc., Buena Park, Calif.

[21] Appl. No.: 889,900

[22] Filed: Jul. 8, 1997

Related U.S. Application Data

[63] Continuation-in-part of Ser. No. 714,471, Sep. 16, 1996, abandoned.

[51] Int. Cl.$^6$ ........................................................ F16L 3/04
[52] U.S. Cl. ..................................... 285/139.2; 285/139.3; 285/148.25; 285/192; 285/236
[58] Field of Search ................................ 285/48, 49, 50, 285/137.1, 139.2, 139.3, 142.1, 148.25, 205, 226, 229, 236, 348, 368, 192

[56] References Cited

U.S. PATENT DOCUMENTS

| | | | |
|---|---|---|---|
| 1,015,180 | 1/1912 | Heitman | 285/226 X |
| 4,211,423 | 7/1980 | Resech | 285/4 X |
| 4,480,860 | 11/1984 | Foresta et al. | 285/236 X |
| 5,027,665 | 7/1991 | Hayward | 285/236 X |
| 5,129,684 | 7/1992 | Lawrence et al. | 285/161 |
| 5,226,681 | 7/1993 | Smith et al. | 285/205 X |
| 5,297,896 | 3/1994 | Webb | 405/52 |
| 5,366,318 | 11/1994 | Brancher | 285/192 X |

FOREIGN PATENT DOCUMENTS

| | | | |
|---|---|---|---|
| 835239 | 3/1952 | Germany | 285/236 |
| 84956 | 11/1935 | Sweden | 285/192 |
| 339678 | 11/1930 | United Kingdom | 285/192 |
| 339678 | 12/1930 | United Kingdom | 285/192 |

OTHER PUBLICATIONS

Containment Technologies Corporation, PERMA-FLEXX™ (4 pages).

Environ Products, Inc., Environ Safe Products designed for future generations, (12 pages).

Total Containment, U.S. Price Manual, Publication No. PM1500, Effective Date Apr. 1, 1995, Supersedes May 1, 1994 (pp. 1–34).

Containment Technologies Corporation, PERMA-FLEXX™ (4 pages).

Environ Products, Inc., Environ Safe Products designed for future generations, (12 pages).

Total Containment, U.S. Price Manual, Publication No. PM1500, Effective Date Apr. 1, 1995, Supersedes May 1, 1994 (pp. 1–34).

*Primary Examiner*—Dave W. Arola
*Attorney, Agent, or Firm*—Christie, Parker & Hale, LLP

[57] ABSTRACT

A flexible penetration fitting is provided for sealing the hole through which a pipeline penetrates a wall of an underground containment box. The penetration fitting includes a flexible boot with a sealing flange for providing a first seal against the inside wall of the box. The sealing flange is held against the wall by a backing ring placed against the outside wall of the box. The backing ring includes a plurality of studs extending through the wall and into the box. A compression ring with a plurality of holes is placed over the sealing flange with the studs of the backing ring extending though the holes. A plurality of nuts are threaded to the studs to hold the sealing flange firmly against the inside wall of the box. The flexible boot also includes a sleeve for providing a second seal against the outside surface of the pipeline. The sleeve is stepped with different sized openings so as to be able to receive different sizes of pipelines. A hose clamp placed around the sleeve at the appropriate sized opening seals the sleeve against the pipeline.

5 Claims, 10 Drawing Sheets

FLEXIBLE PENETRATION FITTING

CROSS REFERENCE TO RELATED APPLICATION

This application is a continuation-in-part of patent application Ser. No. 08/714,471, filed Sep. 16, 1996, abandoned.

FIELD OF THE INVENTION

The present invention relates to a flexible penetration fitting for use with a secondary containment box. More particularly, it relates to a universal penetration fitting that can be used with a broad range of sizes of flexible or rigid pipeline including various configurations of coaxial pipelines. The penetration fitting is also simple to replace in the event it becomes damaged after installation.

BACKGROUND OF THE INVENTION

For several years there has been a growing awareness of air and water pollution problems caused by leaking liquids such as gasoline that flow through buried pipelines such as those present at gasoline service stations. As a result, secondary containment systems have been developed for these systems. A secondary containment system typically includes a primary pipeline in which a product such as gasoline flows from an underground storage tank to a product dispenser. The system also includes a secondary pipeline that surrounds the primary pipeline. The purpose of the secondary pipeline is to contain any fluid that may leak from a damaged primary pipeline, and prevent the fluid from contaminating the surrounding ground. The secondary pipeline is generally monitored for fluid collection so that any leak in the primary pipeline can be repaired promptly.

Fittings known as bulkhead fittings or penetration fittings are generally used in combination with secondary containment systems to permit a buried pipeline to penetrate the wall or bulkhead of a containment box. Containment boxes are liquid-tight boxes associated with connections in the primary pipeline. For example, containment boxes are often provided under product dispensers, at product pumps, or at other junctions in the primary pipeline to contain any product that may leak or spill from the primary pipeline associated with such equipment. A penetration fitting prevents any such liquid that is collected in a containment box from contaminating the ground by sealing the hole in the wall through which the pipeline penetrates the wall of the containment box.

Many different types of penetration fittings have been developed. A popular type of penetration fitting is a boot made from a resilient elastomeric material which imparts flexibility to the joint between the pipeline and the containment box. One such a boot is disclosed at FIG. 22 of U.S. Pat. No. 5,297,896 to Webb. According to the Webb patent the containment box includes a pipe entry hole through which the pipeline extends. Surrounding the entry hole are a plurality of stud holes which assist in fastening the boot to the wall of the containment box. The boot is installed from the outside of the containment box and includes a flexible sleeve section extending from a sealing flange. While the sealing flange is located outside the box, the sleeve extends through the pipe entry hole and into the box. The sealing flange includes integral studs that extend through the stud holes of the containment box. The studs also extend through a plurality of holes in a compression ring located in the box. Nuts are threaded over the studs to press on the compression ring which in turn pulls the sealing flange against the outer surface of the wall of the containment box to effect the seal. The pipeline extends into the box through the flexible sleeve portion of the boot and is sealed to the sleeve portion with a hose clamp.

A similar penetration fitting is sold by Environ Products, Inc. of Lionville, Pa. This penetration fitting additionally includes a return bend in the flexible tube portion such that the sleeve is made of a flexible tube that first extends away from the containment box and then turns inward on itself to extend through the hole in the wall of the containment box. Such a return bend provides further flexibility to the boot.

Fittings with boot portions that are stepped to accommodate two different sizes of pipes are also known. Such penetration fittings allow a single fitting to seal against two different sizes of pipeline where the two pipelines are provided in a coaxial arrangement. Such penetration fittings can also include inserts that can be clamped in place within the flexible tube to allow a single penetration fitting to accommodate different sizes of pipelines. Examples of such penetration fittings and inserts are those sold by Total Containment, Inc. of Exton, Pa.

Because prior art penetration fittings include a boot made from a resilient material, the boot can periodically crack or tear. If the integrity of a penetration fitting is compromised due to a crack or tear in the boot, it must be replaced. However, one important problem with prior art penetration fittings is that they generally cannot be easily removed and reinstalled. Because such a penetration fitting is installed on the containment box from the outside, excavation is required to put a new penetration fitting in place. Such excavation can lead to extensive maintenance costs as well as prolonged downtime of a service station.

SUMMARY OF THE INVENTION

The penetration fitting of the present invention is used for forming a seal between a pipeline and a wall of a containment box. An optional gasket is placed on the outside surface of the wall of the box. A backing ring is also provided outside of the box with a plurality of studs extending from it. The studs are oriented to extend through a plurality of holes in the gasket and into the box. A flexible boot is provided with a sealing flange for placement against the inside surface of the wall. The sealing flange includes a plurality of holes through which the studs extend.

A compression ring is provided over the sealing flange inside the box. The compression ring also has a plurality of holes through which the studs extend. The boot is sealed to the inside wall of the box at the sealing flange by threading nuts to the studs which press the compression ring against the sealing flange and press the sealing flange against the wall. The optional gasket between the backing ring and wall of the box provides further sealing in the event there is leakage through the holes in the sealing flange.

Extending from the sealing flange is a sleeve for receiving the pipeline. In the preferred embodiment the sleeve includes a return bend which provides added flexibility to the boot. The preferred embodiment also includes a stepped sleeve configuration in which the circumference of the sleeve decreases in increments along its length. This configuration permits the boot to accommodate a number of different sizes of pipelines including coaxial pipelines having inner and outer pipelines. A particular pipeline is sealed to the sleeve by a hose clamp at the appropriate location along the length of the sleeve where the pipeline best fits. Any portion of the sleeve smaller than the pipeline can be removed easily with a utility knife.

An important benefit of the penetration fitting of the present invention is that once the backing ring is in place, the boot can be installed entirely from inside the containment box. This permits a damaged boot to be replaced without the need for excavating around the containment box.

BRIEF DESCRIPTION OF THE DRAWINGS

Other features, aspects, and advantages of the present invention will be more fully understood when considered with respect to the following detailed description, appended claims, and accompanying drawings where:

DETAILED DESCRIPTION

Figure 1:
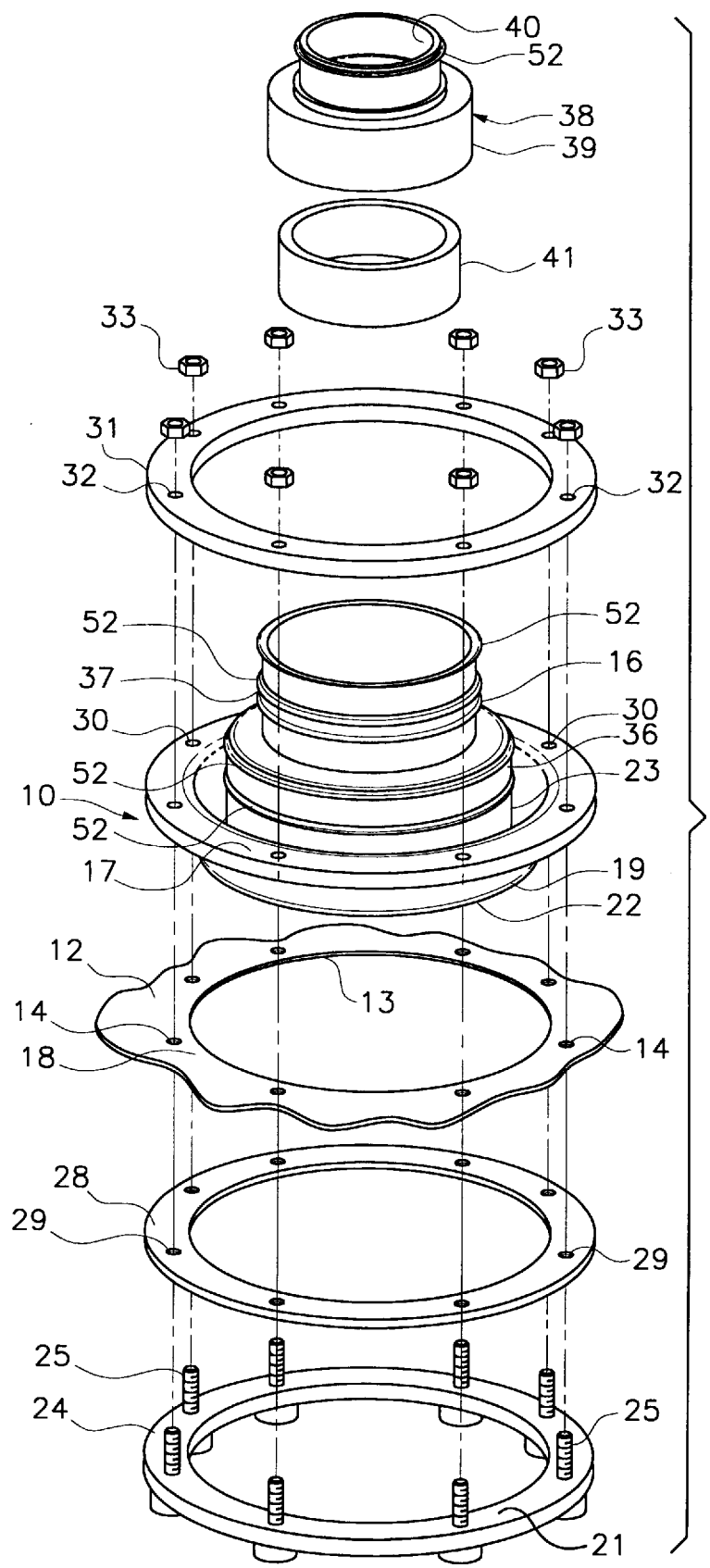
FIG. 1 is an exploded perspective view of a flexible penetration fitting of the present invention.
Figure 2:
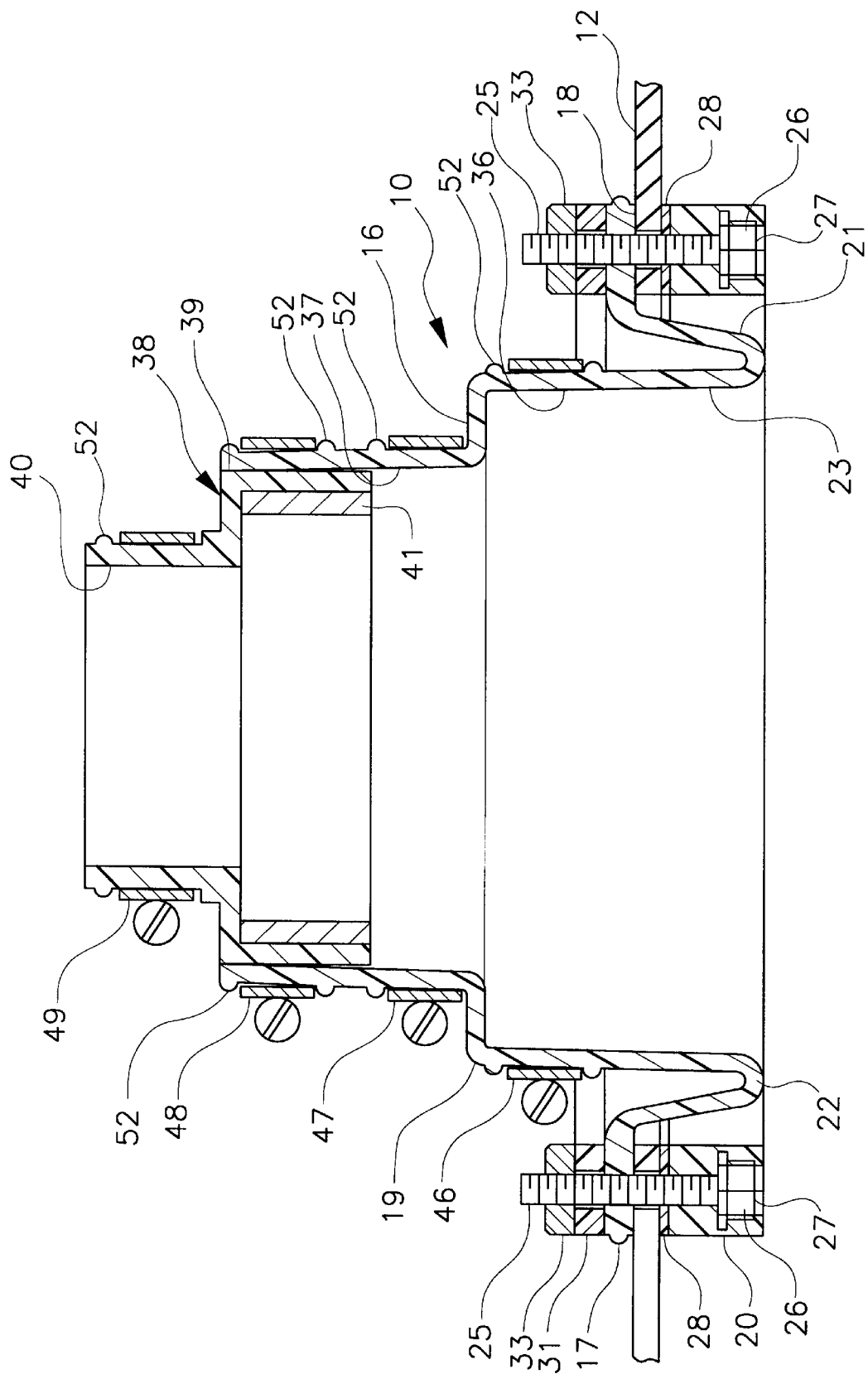
FIG. 2 is a sectional elevation view of the penetration fitting of FIG. 1.

According to the present invention, a flexible penetration fitting 10 as illustrated in FIGS. 1 and 2 is provided to seal a wall 12 of an underground containment box at the point where a pipeline (not shown) penetrates the wall. The containment box includes a first pipe entry hole 13 through which the pipe extends and a plurality of mounting holes 14 arranged around the entry hole for mounting the penetration fitting to the containment box.

The penetration fitting includes a flexible boot 16 made of a resilient oil resistant elastomeric material. The boot includes a ring-shaped sealing flange 17 for providing a seal against the inside surface 18 of the containment box wall. The boot also includes an integral flexible tube portion 19 that extends from the sealing flange. In the preferred embodiment, a first outwardly extending portion 21 of the tube extends in an outward direction away from the containment box. The tube then forms a return bend section 22 where it turns back on itself in an inward direction and back into the containment box to form a sleeve section 23. The sleeve section provides a sealing surface for sealing against the pipeline as will be discussed in further detail below.

The penetration fitting also includes a backing ring 24 provided outside the containment box. The backing ring includes a ring portion 20 with a plurality of studs 25 extending in a direction perpendicular to the plane of the ring portion. Preferably, eight studs are provided spaced equidistantly around the circumference of the backing ring. In the preferred embodiment the ring portion of the backing ring is made of a durable polymeric material with eight bolts 26 fastened to the backing ring by embedding their heads 27 within the backing ring. The threaded shafts of the bolts act as the studs for the backing ring. The backing ring is placed around the pipe entry hole outside the containment box with an optional gasket 28 between it and the wall. The studs of the backing ring extend through a plurality of holes 29 in the surface of the gasket, through the plurality of mounting holes in the wall of the box and into the box. The studs further extend through a plurality of holes 30 in the sealing flange of the boot.

A compression ring 31, also with a plurality of holes 32 for cooperating with the plurality of studs is provided inside the containment box. The compression ring is preferably made of a fairly rigid material compared to that used for the flexible boot. While the compression ring may be made of metal, it is preferably made of a fairly rigid polymeric material such as that used for the ring portion of the backing ring. Eight nuts 33 are threaded to the studs and press the compression ring against the sealing flange to press the sealing flange against the inside wall of the containment box sealing the boot to the containment box.

The flexible sleeve of the boot is designed to receive a variety of different pipe sizes. This is achieved by a stepped configuration in the circumference of the sleeve. A first circumference 36 is provided on the sleeve at a point near the sealing flange. The first circumference is capable of receiving a first pipe with a relatively large diameter. As the sleeve extends away from the sealing flange, the first circumference necks down to a second circumference 37 for receiving a second pipe with an intermediate diameter.

Figure 3:
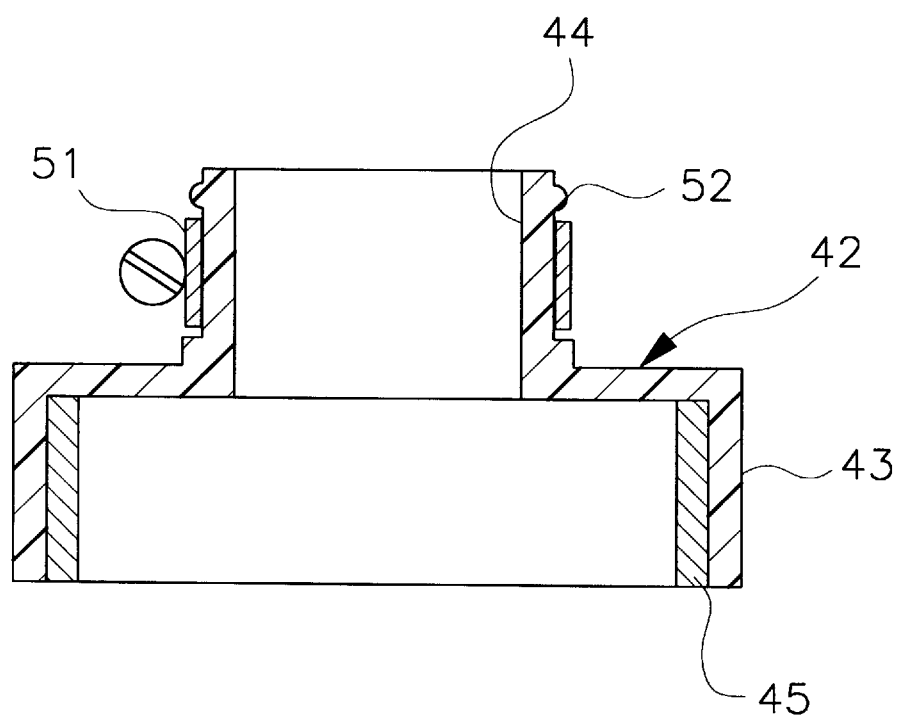
FIG. 3 is a sectional elevation view of an alternative insert for use with the penetration fitting of FIG. 1.

In the preferred embodiment, the penetration fitting also includes a first insert 38 having an outside diameter 39 for cooperating with the second circumference of the sleeve. The outside diameter necks down to a narrower section with an inside opening 40 for receiving a third pipe with a relatively small diameter. A structural ring 41 made of a fairly rigid material is provided inside the first insert at the first diameter to prevent either the insert or the sleeve from collapsing when the insert is attached to the sleeve. A second insert 42 as illustrated in FIG. 3 is also provided similar to the first insert. The second insert has an outside diameter 43 for cooperating with the second circumference of the sleeve and an opening 44 for receiving a fourth pipe with a relatively small diameter different from the diameter of the opening of the first insert. Like the first insert, the second insert includes a structural ring 45 for preventing the insert or the sleeve from collapsing when attached to the sleeve. Preferably, the first and second inserts are made of a resilient elastomeric material similar to that used for the boot. The structural rings are made of a more rigid material, preferably a polymeric material similar to that used for the backing ring.

According to the preferred embodiment, the first circumference is sized to receive a 4 inch pipeline and the second circumference is sized to receive a 3 inch pipeline. The opening of the first insert is sized to receive a 2 inch pipeline while the opening of the second insert is sized to receive a 1½ inch pipeline. A single penetration fitting having a sleeve of this design can receive four different sizes of pipeline.

A plurality of circumferential clamps such as radiator clamps or hose clamps are provided to effect the various seals to the sleeve. Such clamps are well known in the art and generally include a circular band in which the circumference can be adjusted by turning a screw or bolt located on the band. Referring back to FIG. 2, a first hose clamp 46 is provided at the first circumference to seal the sleeve against a large diameter pipe. The hose clamp can be tightened with a tool such as a wrench or screwdriver to seal the sleeve against the pipeline. A second hose clamp 47 and a third hose clamp 48 are provided next to one another at the second circumference to seal the sleeve against either an intermediate diameter pipeline or one of the inserts. A fourth hose clamp 49 and a fifth hose clamp 51 (FIG. 3) are provided to clamp the opening of the first and second inserts around small diameter pipelines.

A plurality of circumferential beads 52 running around the sleeve above each hose clamp help to keep the hose clamps in place at their respective points along the sleeve. The beads are also useful in that they can be used as guides for trimming from the boot any portion of the sleeve that will not be used. For example, if the boot is used to seal a large diameter pipeline, the portion of the sleeve above the bead at the first hose clamp can be trimmed such as with a utility knife.

Figure 4A:
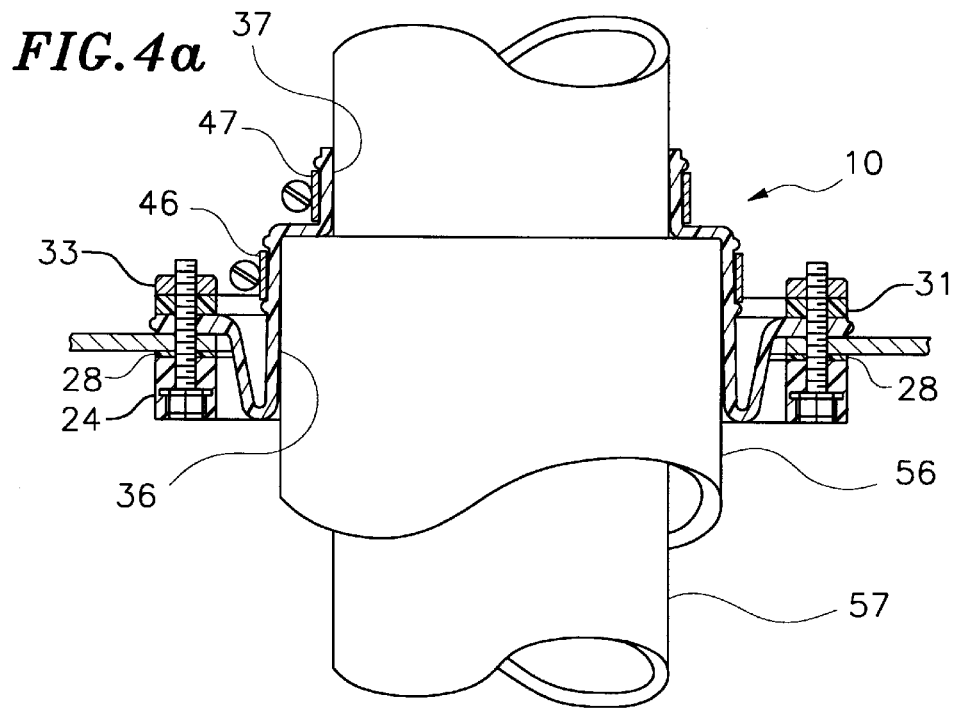
FIGS. 4a–4d are sectional elevation views of the penetration fitting of FIG. 1 when used in various pipeline configurations.

The stepped sleeve design and inserts make the penetration fitting capable of accommodating a number of different piping configurations. Just a few of the many different piping configurations are illustrated in FIGS. 4a–4d. In FIG. 4a, the penetration fitting 10 is shown installed on a system with a coaxial pipeline in which an outer pipeline 56 is provided with a 4 inch diameter and an inner pipeline 57 is provided with a 3 inch diameter. The outer pipeline is sealed to the sleeve at the first circumference 36 by the first hose clamp 46. The inner pipeline is sealed to the sleeve by the second hose clamp 47 at the second circumference 37. The portion of the sleeve above the second hose clamp has been cut away in this installation.

Figure 4B:
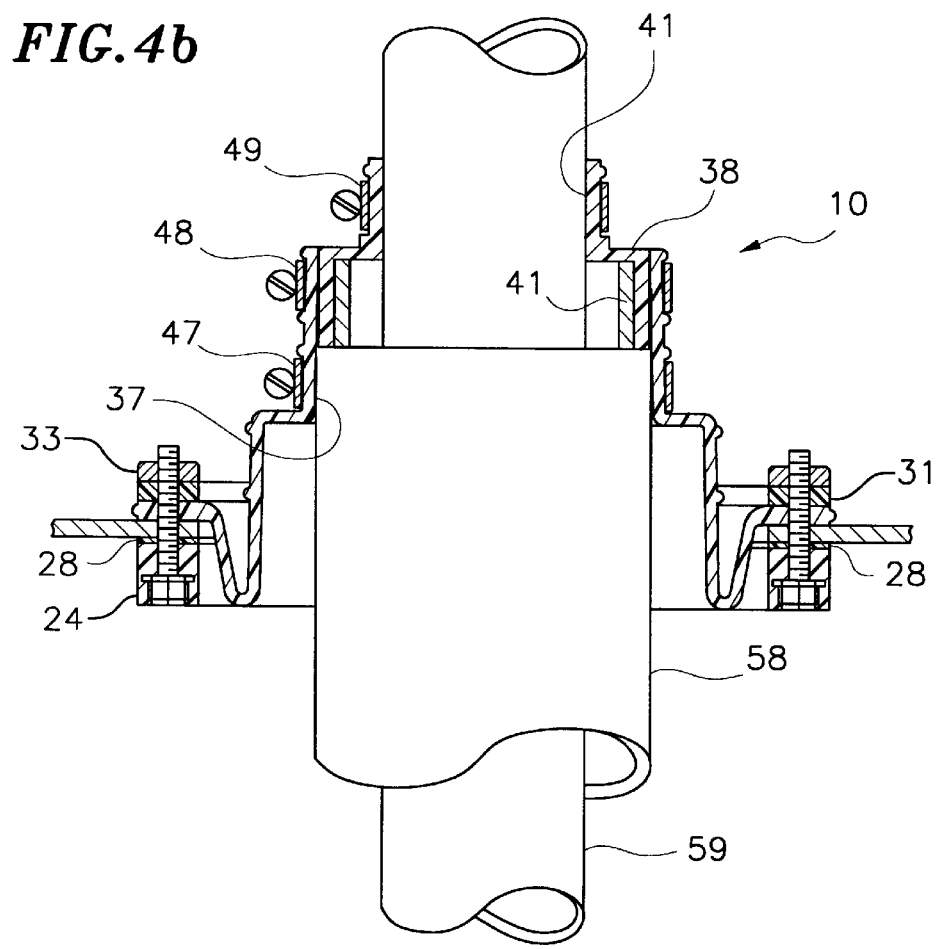

According to FIG. 4b, the penetration fitting 10 is shown installed on a second coaxial pipeline configuration in which an outer pipeline 58 is provided with a 3 inch diameter and an inner pipeline 59 is provided with a 2 inch diameter. The outer pipeline is sealed at the second circumference 37 with the second hose clamp 47. The first insert 38 is sealed to the second circumference with the third hose clamp 48 and the inner pipeline is sealed to the opening 40 of the first insert by the fourth hose clamp 49.

Figure 4C:
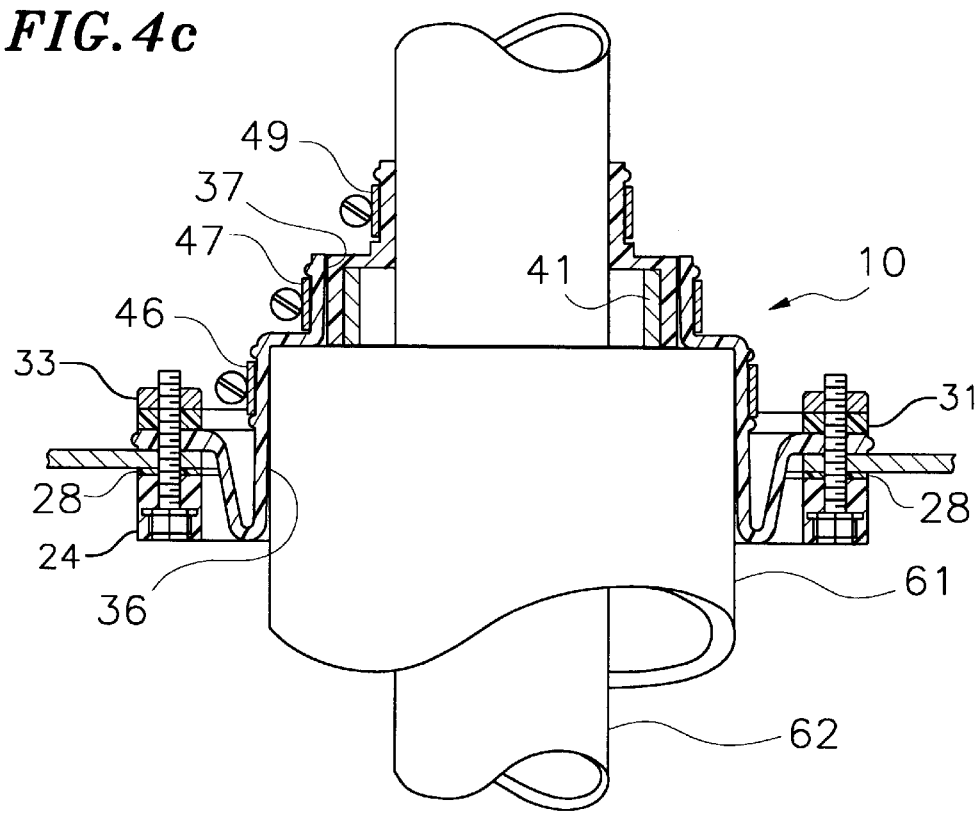

Referring to FIG. 4c, the penetration fitting is configured as installed on yet another coaxial pipeline configuration. An outer pipeline 61 is provided with a 4 inch diameter and is sealed at the first circumference 36 by the first hose clamp 46. The first insert 38 is sealed to the second circumference 37 by the second hose clamp 47. The portion of the sleeve above the second hose clamp has been cut away for this installation. An inner pipeline 62 with a 2 inch diameter is sealed at the opening 40 of the first insert by the fourth hose clamp 49.

Figure 4D:
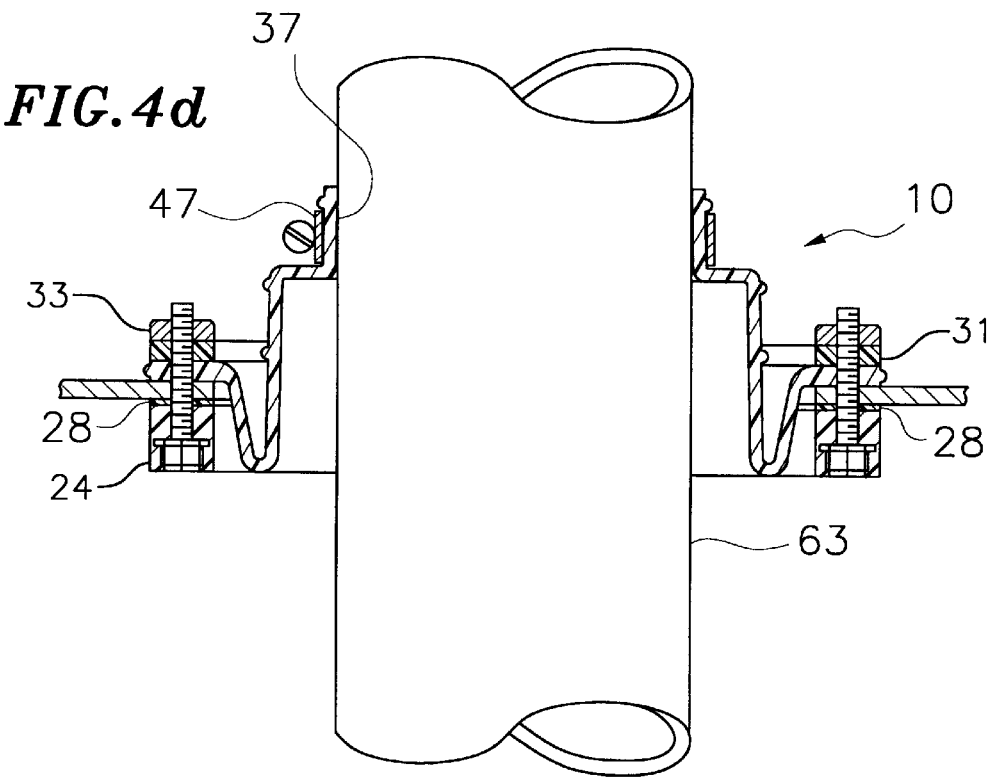

Referring to FIG. 4d, yet another piping configuration is illustrated. Here a pipeline 63 with a 3 inch diameter is sealed to the sleeve at the second circumference 37 with the second hose clamp 47. For this installation the portion of the sleeve above the second hose clamp has been cut away.

Still other configurations are possible with the penetration fitting of the present invention. A single penetration fitting can be used to accommodate pipelines having diameters of 4 inches, 3 inches, 2 inches and 1½ inches. The same penetration fitting can also accommodate coaxial pipelines in which the inner and outer pipeline diameters are (expressed as outer diameter in inches × inner diameter in inches): 4×3; 4×2; 4×1½; 3×2; and 3×1½. The penetration fitting can also be used with either rigid or flexible pipelines.

Figure 5:
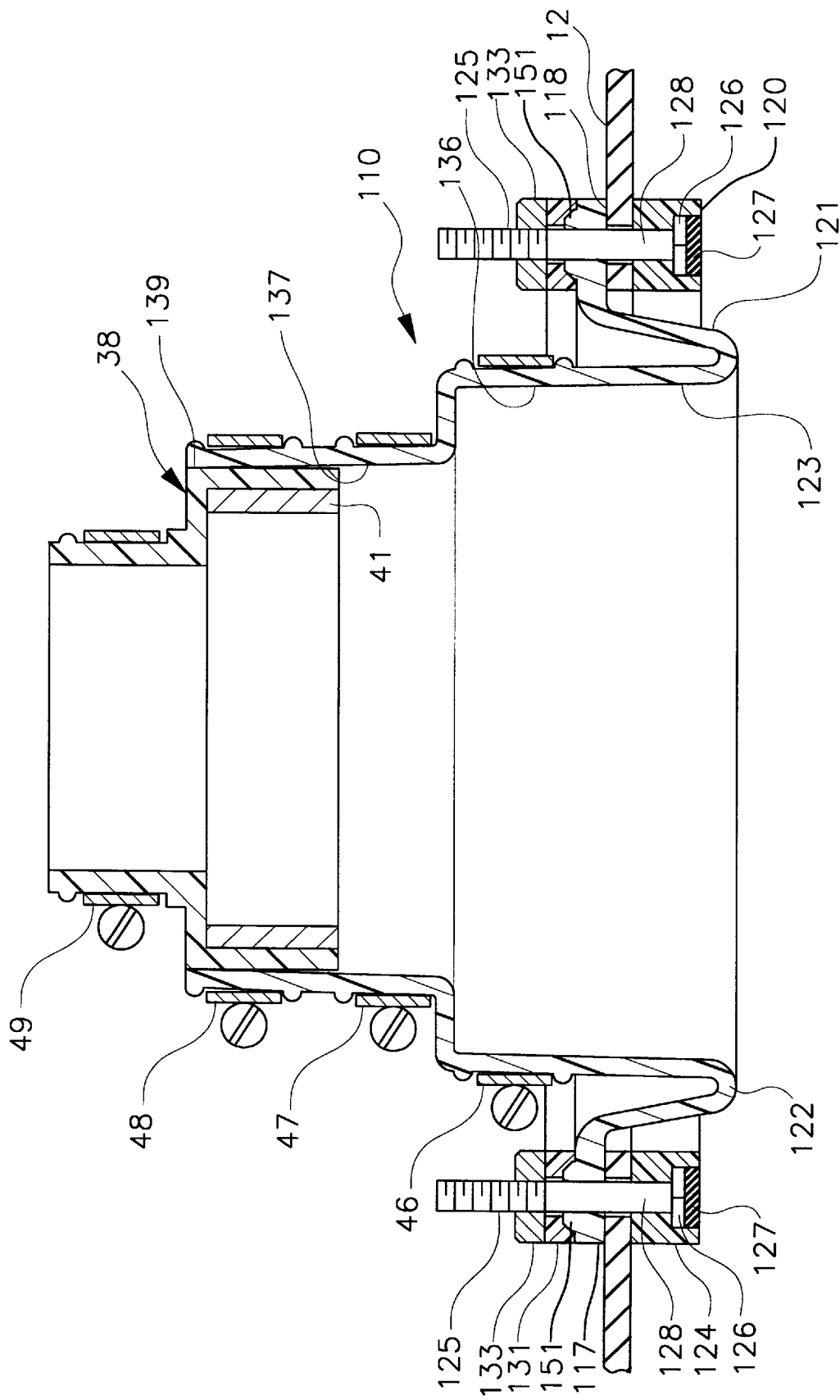
FIG. 5 is a sectional elevation view of another embodiment of the invention.
Figure 6:
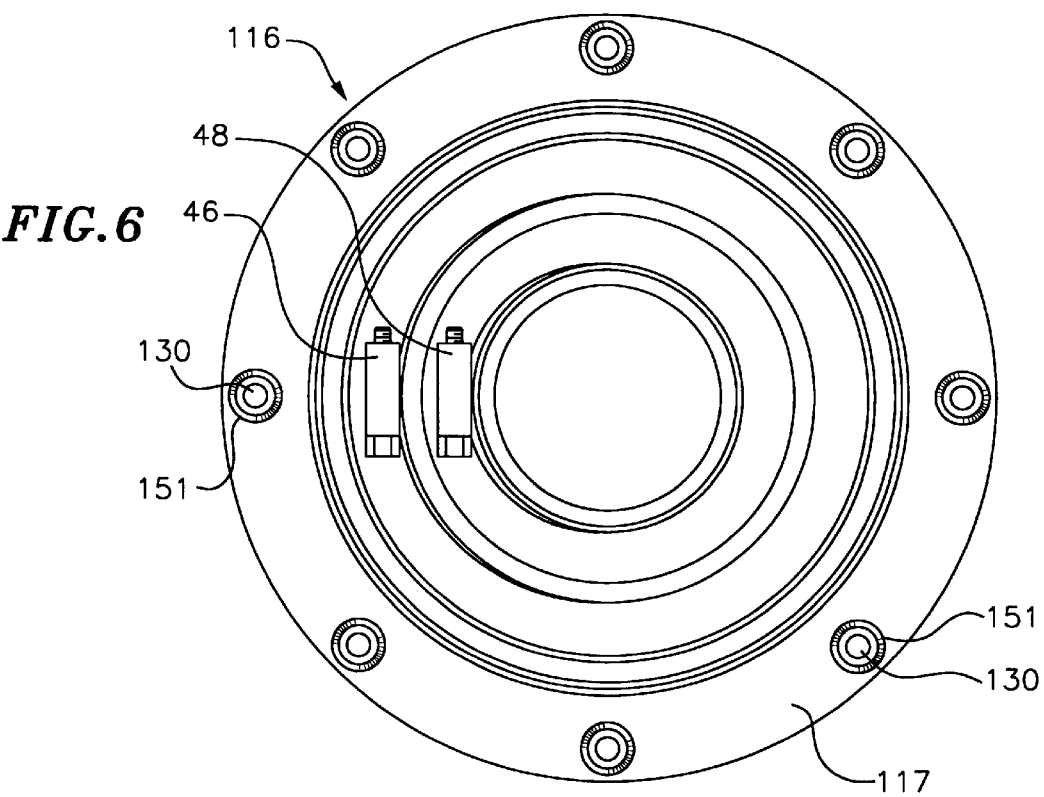
FIG. 6 is a top plan view of the flexible boot of FIG. 5.
Figure 7:
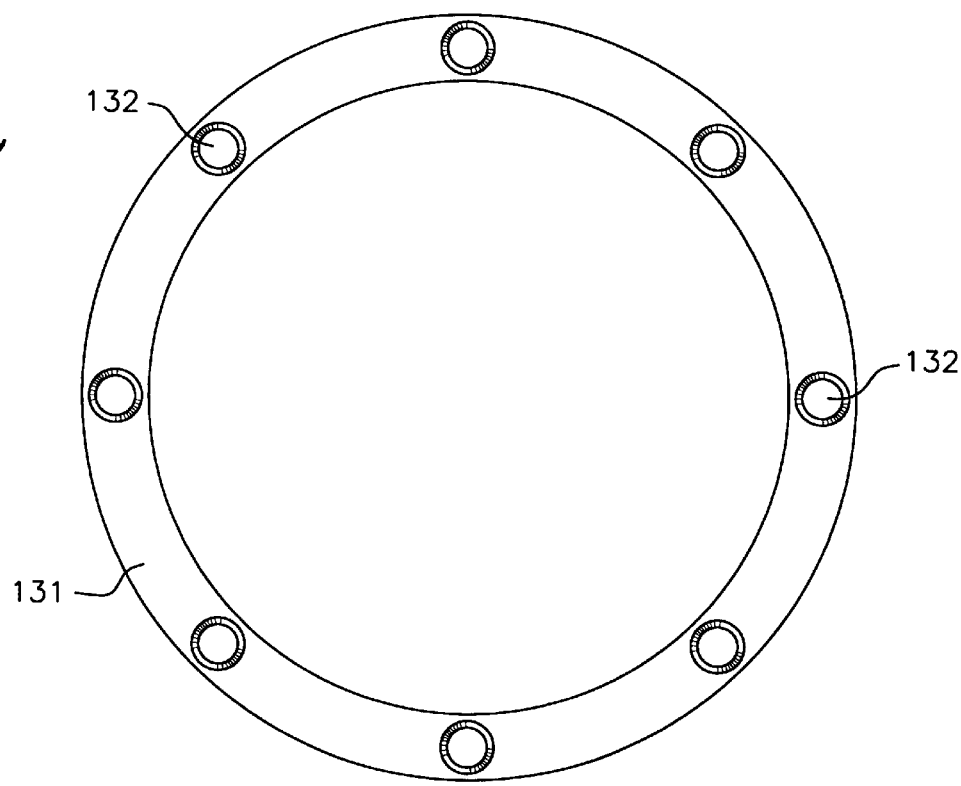
FIG. 7 is a bottom plan view of the compression ring of FIG. 5.

Another embodiment of the present invention is illustrated in FIGS. 5, 6 and 7. This is presently the most preferred embodiment. According to this embodiment as illustrated in FIG. 5, a penetration fitting 110 is attached to the wall 12 of the containment box. The penetration fitting includes a flexible boot 116 (also see FIG. 6) with a sealing flange 117 that seals the flexible boot against the inside surface of the wall of the containment box. The general shape of the flexible boot is identical to the previous embodiment in that it includes a return bend 122 and a sleeve section 123 with a first circumference 136, a second circumference 137 and an insert 38. First, second third and fourth hose clamps 46, 47, 48, 49 are also provided.

Also like the prior embodiment, the heads of a plurality of bolts 126 are embedded within a ring portion 120 of a backing ring 124. Preferably, the bolts are embedded in hexagonal holes in the ring portion and sealed with an epoxy or a sealer such as silicone 127. One important difference in this embodiment over the prior embodiment is that rather than including bolts with shafts threaded their entire lengths, the shafts include a smooth shoulder 128 adjacent the head which extends into an outer threaded stud 125 opposite the head.

Another difference is the inclusion of a number of lips 151, each with a chamfered edge which circumferentially surrounds each of the sealing flange holes 130 on the surface 152 of the sealing flange (FIGS. 5 and 6). The lips mate with a plurality of counter bored holes 132 on a compression ring 131, each of the counter bored holes including each having a similarly chamfered edge. In the most preferred embodiment, the sealing flange holes are slightly smaller than the diameter of the shoulders of the bolts. For ¼ inch diameter bolts, the holes in the sealing flange are preferably 0.010 inch smaller in diameter. It is also preferred that when the penetration fitting is installed, the shoulder portion of each of the bolts should extend up to at least the tops of the lips on the sealing flange holes. It should be noted that even with such tolerances, a single size penetration fitting can fit a number of different containment boxes having different wall thicknesses as the width of the backing ring prevents the nuts 133 from bottoming-out on the threaded portions of the bolts during installation.

According to this embodiment, a particularly reliable seal among the components is achieved when the plurality of nuts are tightened down on the studs. The tightening of the nuts not only presses the sealing flange against the inside surface of the wall of the containment box by sandwiching the sealing flange and the wall between the backing ring and the compression ring, it also helps to seal against leakage which may occur at the bolts. This is accomplished by the cooperation between the lips on the sealing flange and the counter bored holes of the compression ring whereby the counter bored holes press the lips of the sealing flange against the shoulder portions of the bolts. Without such a design, in order to prevent leakage at the bolts, a second gasket such as that illustrated in the embodiment of FIG. 2 is required. In the prior art, leakage at the bolts generally prevented the mounting of a flexible boot to the inside wall of the containment box.

Figure 8:
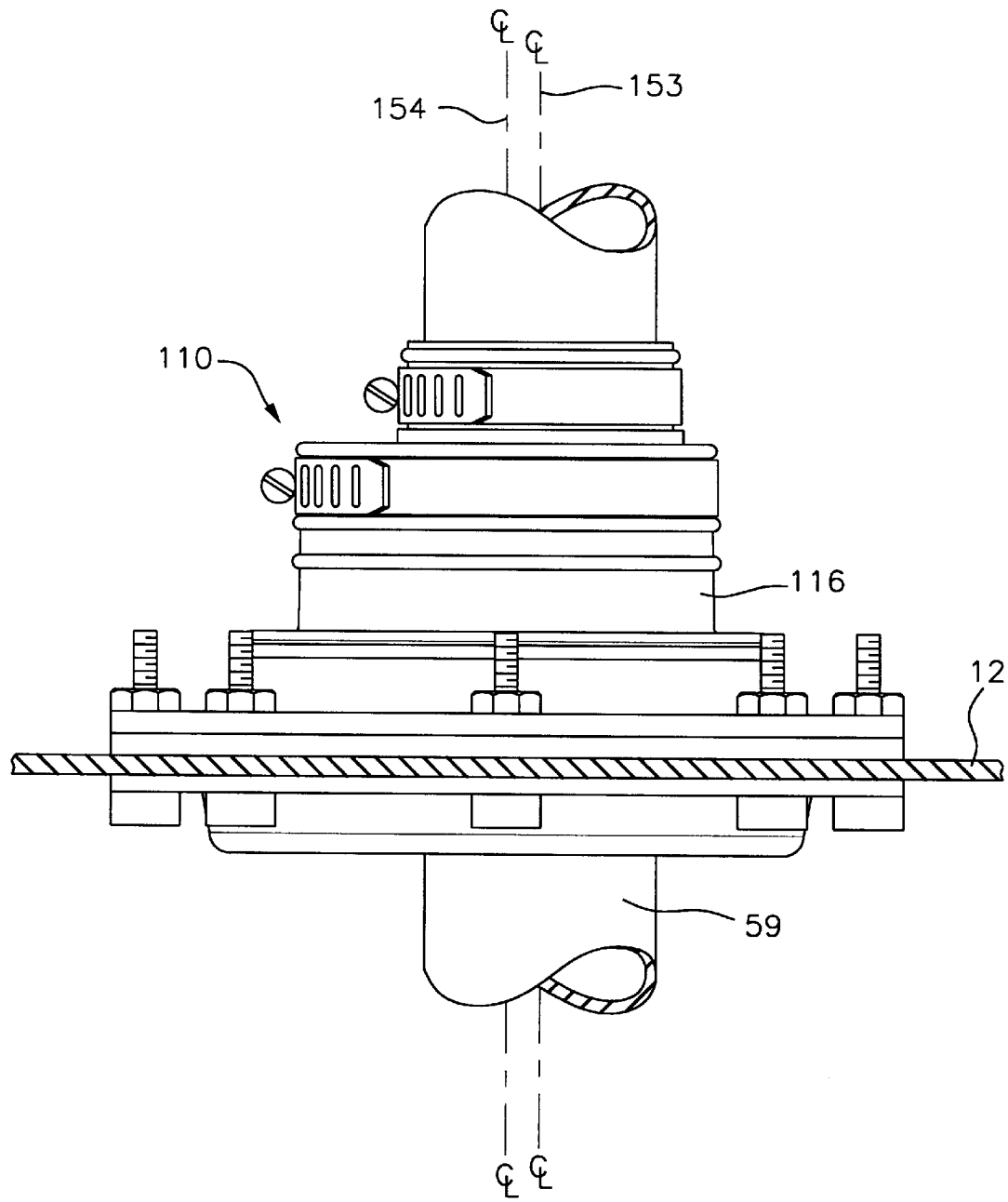
FIGS. 8 and 9 are elevation views of the penetration fitting of FIG. 5 illustrating the flexibility of the boot when installed.

Another advantage to the use of the penetration fitting of the present invention is that the flexible boot permits great flexibility in the joint between the wall of the containment box and the pipeline penetrating the box. For example, as shown in FIG. 8, a penetration fitting 110 with a flexible boot 116 is illustrated in an installation where the center axis 153 of the pipeline 59 does not coincide with the center axis 154 of the entry hole through the wall 12 of the box. Here, a penetration fitting with a sealing flange approximately seven inches in diameter designed for up to a four inch pipeline with an entry hole of about 6 inches, is fitted with a two inch pipeline. By using the design of the present invention, an offset between the center axes of the pipeline and the entry hole is permitted without compromising the integrity of the seal. For an installation with the penetration fitting described above fitted for a three inch pipeline, an offset of ¾ inch is permitted.

Figure 9:
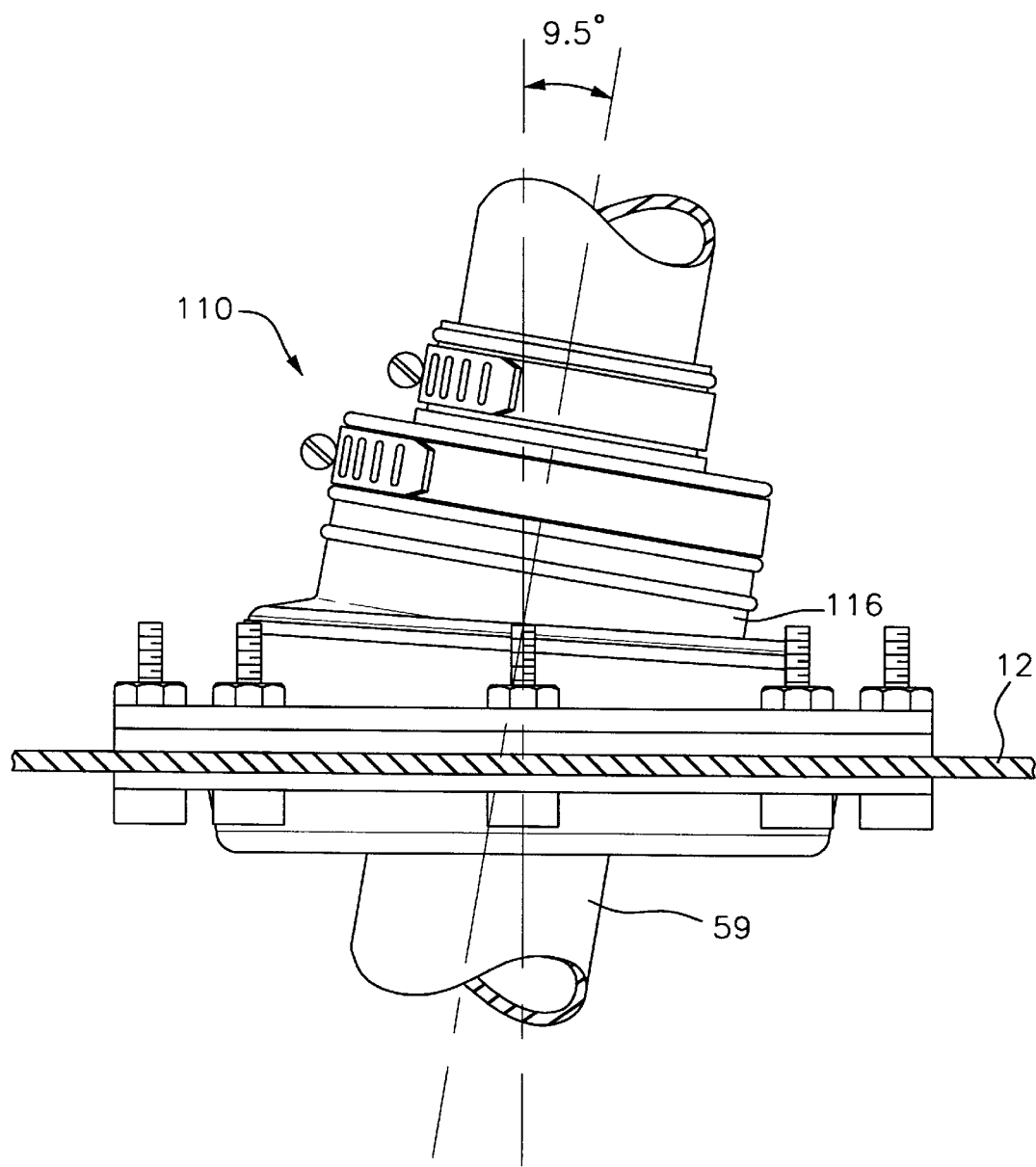

Furthermore, the flexible boot permits the pipeline to enter the box at a broad range of angles. This is in large part due to the low profile of the boot. In FIG. 9, a penetration fitting 110 with a flexible boot 116 and a two inch pipeline 59 attached to the flexible boot is shown flexed to an angle of about 9½ degrees from a line perpendicular to the wall of the box. For a four inch pipeline, an angle of up to about 45 degrees from perpendicular is permitted without compromising the integrity of the seal.

Another important feature of the present invention is that if the boot of a penetration fitting were to crack or tear, a new boot can be installed without excavating the ground around the containment box. First the primary pipeline is disconnected from the equipment inside the containment box. Then the nuts and the compression ring are removed from the penetration fitting. The damaged boot is removed and a new boot is placed over the pipeline such that the holes in the sealing flange fit over the studs of the existing backing ring. The compression ring and nuts are then reinstalled to seal the new boot against the wall of the containment box. There is generally no need to replace the gasket. A hose clamp is placed around the sleeve and tightened to seal the boot to the pipeline. The primary pipeline can then be reconnected to the equipment in the box with minimal downtime. Such a simple method for replacing a boot is impossible with prior art penetration fittings which are installed from the outside of the box.

Yet another advantage of the use of an embodiment such as that illustrated in FIG. 4b is that the use of the insert simplifies assembly of the piping system. The flexible boot of the penetration fitting can first be fastened to the box as set forth above. The insert 38 can then be placed at an appropriate point on the inner pipeline 59 and any fitting (not shown) that is to be placed on the inner pipeline can be attached before the pipeline is set in place. The pipeline can then be inserted into the boot, the second hose clamp 47 can be tightened against the outer pipeline 58, the insert can be slid along the inner pipeline until it rests within the sleeve of the boot, the third hose clamp 48 can be tightened to the insert and the fourth hose clamp 49 can be tightened to fasten the inner pipeline to the boot. For coaxial pipelines that require special equipment to attach a fitting to the inner pipeline, it can greatly simplify assembly if the fitting is attached to the end of the pipeline before the pipeline is placed in the box.

The use of the insert also simplifies the later replacement of the boot if the boot is ever damaged. In order to replace a damaged boot, first the inner pipeline is disconnected from any equipment in the box. Then the nuts and compression ring are removed along with the second and third hose clamps 47 and 48. The inner and outer pipelines can be left in place with the insert attached and the boot can be pulled over the pipeline including any fitting that may be attached to the inner pipeline. A new boot can then be pulled over the pipeline and sealed as set forth above. Without an insert, it can be difficult to pull a new boot over the pipeline, especially if the inner pipeline includes a permanently mounted fitting.

Figure 10:
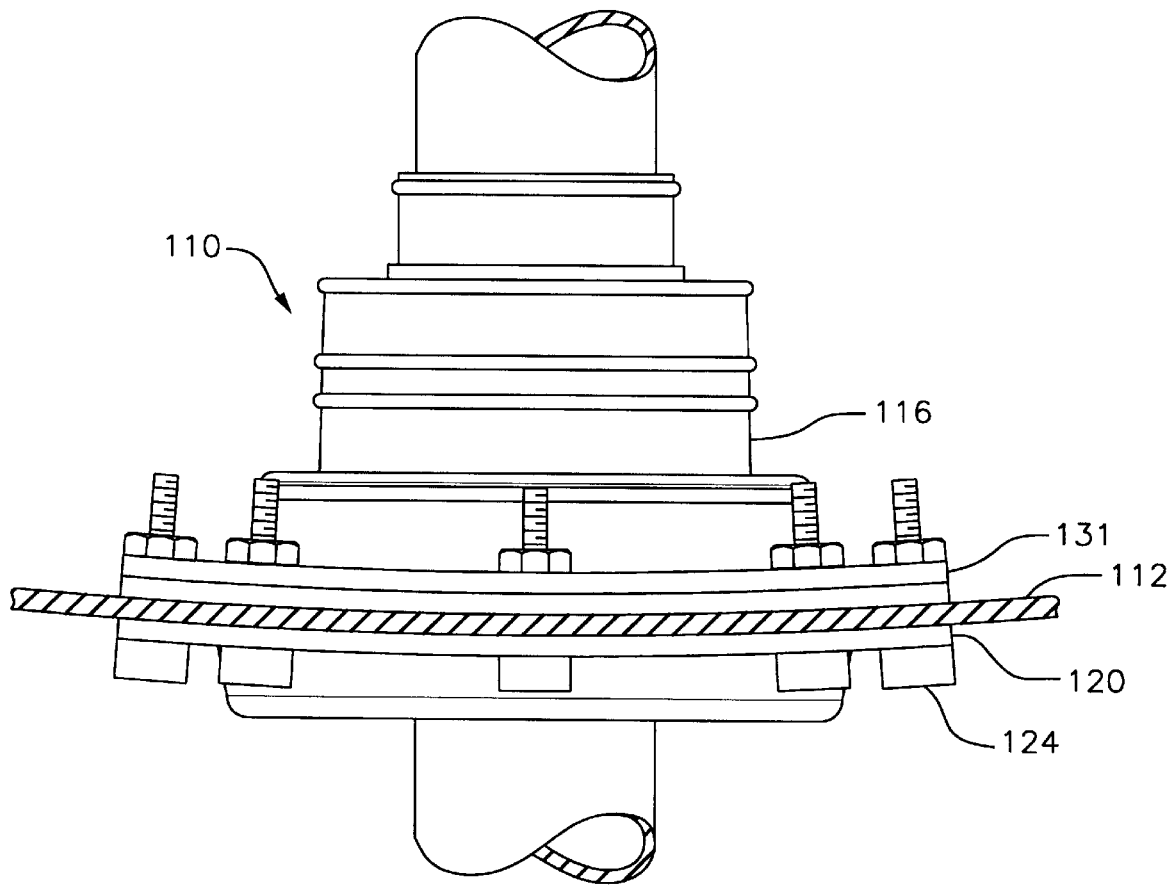
FIG. 10 is an elevation view partly in section illustrating the penetration fitting of FIG. 5 installed on a curved wall.

Still another advantage of the penetration fitting of the present invention is that the flexible boot permits the fitting to be installed on a slightly curved wall without the use of any special adaptors. According to FIG. 10, a penetration fitting 110 with a flexible boot 116 is shown attached to a containment box with a curved wall 112. Not only can the flexible boot be easily flexed to conform to the curvature of the wall, but since the ring portion 120 of the backing ring 124 and the compression ring 131 are also made of a somewhat resilient material, they too can conform to the curvature of the wall. The preferred material for these components is an acetyl copolymer sold under the name Celcon™. This is also the preferred material for the ring portion of the backing ring, the compression ring and the structural rings of the inserts. A penetration fitting with a seven inch flange and designed for up to a four inch pipeline can be mounted on a cylindrical wall having a radius of curvature greater than about 10 inches without the need for special fittings as are generally required for prior art penetration fittings. For walls having a smaller radius of curvature, a dished backing ring with a similarly dished compression ring can be provided for use with the same flexible boot described above.

What is claimed is:

1. A penetration fitting for forming a seal between a pipeline and a wall having an inside surface and an outside surface, the penetration fitting comprising:

a backing ring comprising a ring portion and a plurality of studs extending from the ring portion, the backing ring for placement against the outside surface of the wall and the studs for extending through the wall, the studs including a first smooth shoulder portion proximate the ring portion and a second threaded portion distal the ring portion;

a flexible boot comprising:
      a sleeve for receiving the pipeline; and
      a sealing flange including a first face for placement against the inside surface of the wall, a second face opposite the first face, a plurality of apertures extending between the first and second faces for receiving the plurality of studs, and a plurality of lips extending circumferentially around each aperture;

a clamp for sealing the sleeve of the flexible boot to the pipeline;

a compression ring defining a plurality of holes for receiving the plurality of studs, each hole including a counter bore for mating with the lips of the sealing flange; and a plurality of nuts for cooperating with the studs to press the sealing flange between the compression ring and the inside surface of the wall.

2. The penetration fitting of claim 1 wherein the flexible boot further comprises a return bend.

3. The penetration fitting of claim 1 wherein the flexible boot further comprises a plurality of stepped openings for receiving a plurality of different sizes of pipes.

4. The penetration fitting of claim 3 further comprising an insert for cooperating with an opening to receive yet another different size of pipe.

5. The penetration fitting of claim 1 wherein the backing ring and the compression ring are made of a deformable material that permits the fitting to be installed on a curved wall.

\* \* \* \* \*